US012595049B2

(12) United States Patent (10) Patent No.: US 12,595,049 B2

Moret (45) Date of Patent: Apr. 7, 2026

(54) METHOD FOR CONTROLLING A ROTORCRAFT, ASSOCIATED ROTORCRAFT AND COMPUTER PROGRAM

(71) Applicant: AIRBUS HELICOPTERS, Marignane Cedex (FR)

(72) Inventor: Robin Moret, Les Pennes Mirabeau (FR)

(73) Assignee: AIRBUS HELICOPTERS, Marignane Cedex (FR)

( * ) Notice: Subject to any disclaimer, the term of this patent is extended or adjusted under 35 U.S.C. 154(b) by 30 days.

(21) Appl. No.: 18/744,840

(22) Filed: Jun. 17, 2024

(65) Prior Publication Data

US 2025/0136273 A1 May 1, 2025

(30) Foreign Application Priority Data

Oct. 26, 2023 (FR) ...................................... 2311651

(51) Int. Cl.
*B64C 27/57* (2006.01)
*B64C 27/04* (2006.01)

(52) U.S. Cl.
CPC .............. *B64C 27/57* (2013.01); *B64C 27/04* (2013.01)

(58) Field of Classification Search
CPC ......... B64C 27/57; B64C 27/04; B64C 27/12; F05D 2270/02; F05D 2270/052; B64D 35/08; B64D 31/12; B64D 35/02; B64D 37/34; B64D 31/09; F02C 7/36; F02C 9/42
See application file for complete search history.

(56) References Cited

U.S. PATENT DOCUMENTS

| | | | | |
|---|---|---|---|---|
| 7,677,492 | B1 * | 3/2010 | Carter, Jr. ............. | B64C 27/025 244/17.11 |
| 8,966,904 | B2 * | 3/2015 | Lollini ................... | B64D 37/00 60/734 |
| 8,989,921 | B2 * | 3/2015 | Nannoni ............. | G05D 1/0858 701/16 |
| 9,073,635 | B2 * | 7/2015 | Mezan ................. | G05D 1/0858 |
| 9,193,453 | B2 * | 11/2015 | Vallart ................... | B64C 27/04 |
| 9,463,874 | B2 * | 10/2016 | Vallart ................ | G05D 1/0072 |

(Continued)

FOREIGN PATENT DOCUMENTS

EP 3251955 A1 12/2017

OTHER PUBLICATIONS

French Search Report for French Application No. FR2311651, Completed by the French Patent Office, Dated Apr. 15, 2023, 12 pages.

*Primary Examiner* — Mussa A Shaawat
(74) *Attorney, Agent, or Firm* — BROOKS KUSHMAN P.C.

(57) ABSTRACT

A method for controlling a rotorcraft, the rotorcraft comprising at least two combustion engines, at least one regulation system and one transmission system, the at least two engines being mechanically connected to the transmission system respectively by at least two couplings. Such a control method comprises at least identifying an N2-regulated engine, identifying a non-N2'-regulated engine and generating a control setpoint limit for at least one first regulation system of the N2-regulated engine and depending on the speed of rotation N2 of at least one first output shaft of the N2-regulated engine.

20 Claims, 3 Drawing Sheets

(56) References Cited

U.S. PATENT DOCUMENTS

| | | | | |
|---|---|---|---|---|
| 9,676,490 | B2 * | 6/2017 | Vallart | F02C 9/42 |
| 11,174,016 | B2 * | 11/2021 | Carter, Jr. | B64D 31/16 |
| 11,203,419 | B2 * | 12/2021 | Taheri | B64D 31/06 |
| 11,634,235 | B1 * | 4/2023 | Hinman | B64C 27/57 |
| | | | | 244/17.13 |
| 2007/0118254 | A1 * | 5/2007 | Barnes | B64C 27/57 |
| | | | | 701/3 |
| 2009/0139202 | A1 * | 6/2009 | Agrawal | F02C 6/206 |
| | | | | 60/226.3 |
| 2011/0024552 | A1 * | 2/2011 | Patt | B64C 29/0033 |
| | | | | 244/6 |
| 2012/0153072 | A1 * | 6/2012 | Eglin | B64C 27/26 |
| | | | | 244/17.13 |
| 2013/0054053 | A1 | 2/2013 | Greenfield et al. | |
| 2013/0213044 | A1 * | 8/2013 | Lollini | F02C 7/22 |
| | | | | 60/734 |
| 2014/0229036 | A1 * | 8/2014 | Vallart | B64C 27/57 |
| | | | | 701/3 |
| 2014/0246541 | A1 * | 9/2014 | Feyzeau | G05D 1/0676 |
| | | | | 244/1 N |
| 2014/0283527 | A1 | 9/2014 | Ling et al. | |
| 2014/0302461 | A1 * | 10/2014 | Dumur | G09B 9/46 |
| | | | | 434/33 |
| 2016/0001880 | A1 * | 1/2016 | Vallart | G05D 1/0858 |
| | | | | 701/3 |
| 2016/0221685 | A1 | 8/2016 | Vallart et al. | |
| 2016/0318617 | A1 * | 11/2016 | Massot | B64D 25/00 |
| 2017/0025032 | A1 * | 1/2017 | Dumar | G09B 9/44 |
| 2017/0088281 | A1 * | 3/2017 | Vallart | B64C 27/12 |
| 2017/0210480 | A1 * | 7/2017 | Lauder | B64D 27/33 |
| 2018/0178908 | A1 * | 6/2018 | Taheri | B64C 27/12 |
| 2019/0031361 | A1 * | 1/2019 | McCullough | B64D 27/406 |
| 2019/0382124 | A1 | 12/2019 | Massot et al. | |
| 2020/0094952 | A1 * | 3/2020 | Cerqueira | B64C 27/82 |
| 2022/0081122 | A1 * | 3/2022 | Gazzino | B64D 35/025 |
| 2022/0380020 | A1 * | 12/2022 | Raynaud | B64C 1/0009 |
| 2024/0425188 | A1 * | 12/2024 | Mark | B64D 27/33 |
| 2025/0052201 | A1 * | 2/2025 | Alahyari | F02C 7/36 |

* cited by examiner

METHOD FOR CONTROLLING A ROTORCRAFT, ASSOCIATED ROTORCRAFT AND COMPUTER PROGRAM

CROSS REFERENCE TO RELATED APPLICATION

This application claims the benefit of FR 23 11651 filed on Oct. 26, 2023, the disclosure of which is incorporated in its entirety by reference herein.

TECHNICAL FIELD

The present disclosure relates to a method for controlling a rotorcraft, and a rotorcraft and a computer program associated with the control method.

BACKGROUND

A rotorcraft comprises at least one rotor helping provide lift for the rotorcraft and possibly also propulsion.

For example, a rotorcraft may comprise a main rotor helping provide lift and propulsion for the rotorcraft, this main rotor having blades with collectively and cyclically variable pitch. The rotorcraft may also comprise a system that helps control the yaw motion, such as another main rotor or a rear rotor, for example. The pitch control system can be activated, for example, by the pilot or the crew. Alternatively, the system can be activated by an automatic control system referred to as an autopilot.

In order to set the rotor or rotors in motion, the rotorcraft comprises a power plant, that may be a multi-engine power plant, and a power transmission system leading from the engines to one or more rotors.

For example, two engines are connected to a gearbox, this gearbox setting the rotor or rotors in motion. The gearbox then comprises one mechanical input for each engine, the mechanical inputs being engaged with a mixing unit, the mixing unit driving one mechanical output of the gearbox for each rotor. The engine inputs, the mixing unit and the mechanical outputs may comprise at least one pinion or one toothed wheel, at least one shaft, at least one speed reduction stage, etc.

The engines may be heat engines having an output shaft set in motion by the combustion of fuel. For example, at least one engine may be a turboshaft engine provided with a gas generator and a free working turbine connected to the output shaft.

Each engine may be controlled by a regulation system known as a Full Authority Digital Engine Control or FADEC. Such a regulation system comprises an engine computer in communication with sensing devices measuring values of operating parameters of the controlled engine, or of the rotorcraft, such as a speed of rotation of a gas generator or free turbine, an internal temperature or a speed of rotation of a rotor of the rotorcraft.

This engine computer is then configured to control a fuel metering valve supplying the associated engine in order, for example, to stabilize a speed of rotation of the output shaft at a setpoint speed, regardless of the power consumed by this output shaft. This power varies depending on the actions of a pilot on flight controls, in particular on controls that collectively and/or cyclically vary the pitch of the blades of the main rotor on a helicopter. Alternatively, these controls may be actuated by an automatic flight control system.

Implementing regulation as a function of the speed of rotation (N2) of the output shaft of the turboshaft engine then ensures that the power produced by the output shafts of the engines is permanently matched to the power consumed by the rotor or rotors, meaning that the rotor or rotors rotate at a nominal speed of rotation compatible with their function of generating lift for the rotorcraft.

However, the engine computer is configured to prevent the power developed by an engine from exceeding a mechanical limit acceptable to the engine or the power transmission system. Conventionally, various operating modes associated with specific limits and durations of use are defined. For each operating mode, these limits may comprise, for example, a limit on the torque delivered by an engine, a limit on an internal temperature of an engine, a limit on the speed of rotation of an engine shaft, a limit on the torque of at least one member of the power transmission system, etc.

Operating modes known on a multi-engine aircraft include "All Engines Operating" or AEO operating modes, that can be used for certain periods of time when all of the engines are operating normally, and "One Engine Inoperative" or OEI operating modes, that can be used for certain periods of time when one of the engines has failed. Using certain operating modes may result in maintenance work needing to be carried out on the engines or on the power transmission system.

Therefore, an engine computer controls the fuel metering valve in such a way as to modulate the power of the associated engine. A first type of regulation consists in bringing the speed of rotation of the output shaft towards a setpoint value, while avoiding exceeding a limit. This type of regulation is referred to as N2 regulation because it is dependent on the speed of rotation of the output shaft of the associated engine.

Another type of regulation consists in delivering a power predefined for the engine, for example in order to reach an optimum operating point in terms of thermodynamic efficiency.

However, in the case of a rotorcraft, it is advantageous for at least one of the engines to be regulated as a function of the speed of rotation N2 of its output shaft. Indeed, such regulation, referred to as "N2" regulation, makes it possible to avoid a regular reduction in the speed of rotation NR of the lift rotor, that is itself directly linked to the speed of rotation N2.

When a limit is reached, the engine computer limits the flow rate of fuel transmitted to the engine, and the power delivered by its output shaft therefore drops below the required power. The pilot then needs to act on the flight controls in order to reduce the power required for the flight.

To this end, the rotorcraft may comprise various indicators enabling a pilot to assess the situation. These indicators may comprise an indicator indicating the speed of rotation of the main rotor and the associated limits, engine indicators indicating the current values of the monitoring parameters of the engine (temperature, mode, torque) and the associated limits, indicators indicating the current values of the monitoring parameters of the power transmission system and the associated limits, a first-limitation indicator displaying information relating to the parameter closest to one of these limits, from among several monitored parameters.

Moreover, in the event of a fault or failure of the regulation system of an engine, the flow rate of fuel supplying the engine in question is fixed at the most recent flow rate value used. A pilot is informed of this and may then either switch off the engine in question, for safety reasons, or continue the flight as is, i.e., with an engine that is not under N2 regulation.

If the flight is continued as is, the pilot must make sure that no limit of the mechanical power transmission system is exceeded. On a twin-engine rotorcraft, if a pilot requests power in order to perform a maneuver, the sum of the powers delivered by the N2-regulated engine and the non-N2-regulated engine could become higher than the value permitted by the mixing unit of a gearbox, for example.

More generally, managing a lack of regulation, that may be deliberate or accidental, of one of the engines of a rotorcraft may involve an additional workload for the crew in order not to exceed a limit of the mechanical power transmission system.

Furthermore, documents US 2019/382124, US 2014/283527, US 2016/221685, EP 3251955 and US 2013/054053 relate to other known methods for controlling rotorcraft.

SUMMARY

An object of the present disclosure is thus to propose a method that helps limit the workload of a crew in the event of a fault in a regulation system of an engine on a multi-engine rotorcraft or in the absence of regulation of one of the engines. Furthermore, this method may enable a pilot to perform piloting maneuvers in complete safety, without the risk of degrading the mechanical power transmission system of the rotorcraft.

The disclosure therefore relates to a method for controlling a rotorcraft, the rotorcraft comprising at least two combustion engines, at least one regulation system and one transmission system, said at least two engines being mechanically connected to the transmission system respectively by at least two couplings.

According to the disclosure, such a control method is remarkable in that it comprises at least the following steps:
  identifying at least one engine referred to as an N2-regulated engine from among said at least two engines, said at least one N2-regulated engine being identified as an engine supplied with fuel with a fuel flow rate regulated as a function of the speed of rotation N2 of at least one first output shaft of said at least one N2-regulated engine and supplied by at least one first fuel metering valve controlled as a function of a flow rate setpoint transmitted by at least one first regulation system depending on the speed of rotation N2 of said at least one first output shaft;
  identifying an engine referred to as a non-N2'-regulated engine from among said at least two engines, the non-N2'-regulated engine being identified as an engine supplied with fuel with a fuel flow rate that is not regulated as a function of the speed of rotation N2' of a second output shaft of the non-N2'-regulated engine and supplied by a second fuel metering valve that is either not regulated, or is controlled as a function of a flow rate setpoint transmitted by at least one second regulation system, irrespective of the speed of rotation N2' of the second output shaft;
  determining at least one first permissible input torque limit for at least a first coupling of the transmission system connected to said at least one first output shaft;
  determining a second permissible input torque limit for a second coupling of the transmission system connected to the second output shaft;
  determining a first current operating torque transmitted by said second output shaft to the second coupling of the transmission system;

determining at least one permissible residual combined torque limit for at least one member of a mixing unit of the transmission system, said at least one residual combined torque limit being calculated according to the following formula:

$$CR1 = Cadm - (C1 * Z)$$

where Cadm is a permissible combined torque limit for said at least one member of the mixing unit;
  C1 is the first current operating torque transmitted by the second output shaft to the second coupling of the transmission system; and
  Z is a reduction coefficient between a speed of rotation of the second coupling and a speed of rotation of said at least one member of the mixing unit;
  identifying a critical torque limit as being the lowest of the values from among said at least one first input torque limit, second input torque limit and at least one residual combined torque limit; and
  generating a control setpoint limit of said at least one first regulation system, the control setpoint limit being generated as a function of said critical torque limit.

The step of identifying a non-N2'-regulated engine may be implemented in various ways. For example, on an aircraft with identical engines that need to operate in the same manner, this step may comprise detecting asymmetrical operation of the engines by possibly detecting that a predetermined difference has been exceeded between a first fuel flow rate supplied by a first fuel metering valve supplying fuel to one engine and a second fuel flow rate supplied by a second fuel metering valve supplying fuel to another engine.

According to another example, a non-N2'-regulated engine may be identified when the fuel flow rate permitted by its fuel metering valve is constant over a time interval or varies according to a regulation parameter different from the speed of rotation N2' of the second output shaft.

According to another example, a non-N2'-regulated engine may be identified when the fuel flow rate permitted by its fuel metering valve, and therefore the position of the metering valve, does not correspond to a flow rate or position setpoint of the metering valve that it receives.

Such a step of identifying a non-N2'-regulated engine may be implemented by means of a control system connected via wired or wireless means to one or more regulation systems comprising one or more engine computers, such as FADECs, managing the fuel flow rate setpoints of each engine. A controller of the control system can therefore identify the N2-regulated engines and the non-N2'-regulated engines.

Furthermore, each N2-regulated engine may be identified when the corresponding fuel flow rate is variable within a predetermined time interval according to a regulation parameter depending on the speed of rotation N2 of each first output shaft.

Moreover, the steps of determining the first and second input torque limits may be implemented by calculations, tests or simulations prior to a flight of the rotorcraft. The first and second input torque limits are then transmitted and stored by the control system in the rotorcraft.

The step of determining a first current torque may be implemented by the control system, for example, by means of a torque measurement taken on the input shafts of the transmission system by means of sensing devices such as torquemeters or indeed from information relating to power and speed of rotation transmitted by engine computers of each of the N2-regulated and non-N2'-regulated engines.

Furthermore, the values of the permissible torque limit Cadm and the reduction coefficient Z may be determined by ground tests, flight tests or simulations.

The values of the permissible torque limit Cadm and the reduction coefficient Z can therefore be stored prior to a mission of the rotorcraft in at least one memory on board the rotorcraft.

The step of determining at least one residual combined torque limit is implemented during flight after having identified a non-N2'-regulated engine. Indeed, the controller of the control system can calculate the residual combined torque limit or limits from at least one permissible combined torque limit of the member or members of a mixing unit of the transmission system and from the first current operating torque transmitted by the non-N2'-regulated engine.

Said permissible combined torque limit for a respective member of the mixing unit may be determined by calculations, tests or simulations prior to a flight of the rotorcraft. The permissible combined torque limit or limits are therefore predetermined values transmitted and stored in a memory of the control system in the rotorcraft.

The controller of the control system then identifies the critical torque limit by comparing the values of said at least one first input torque limit, second input torque limit and at least one residual combined torque limit.

Depending on this critical torque limit, the step of generating a control setpoint limit of said at least one first regulation system makes it possible to control, without the pilot's intervention, and indeed to limit, the total power transmitted jointly, by the N2-regulated and non-N2'-regulated engines, to the transmission system, in order to prevent an input torque limit or a combined torque limit from being exceeded. This limitation of the power transmitted to the transmission system may in particular may be implemented manually by a pilot of the rotorcraft or automatically by the automatic flight control system in order to comply with the control setpoint limit of the first regulation system or systems.

Such a control method therefore helps protect the members of a transmission system, in particular by limiting the torque transmitted by engines to a power transmission system, in the event of absence of regulation of one of the engines.

Moreover, each of the first and second input torque limits may be defined for a maximum period of use of the limit corresponding to a particular operating mode. Several first input torque limits of a first coupling can then form a first set of input torque limits and several second input torque limits of a second coupling can then form a second set of input torque limits.

Consequently, each of the residual combined torque limits can also be defined for a maximum period of use of the limit corresponding to a particular operating mode. Several residual combined torque limits of a member of the mixing unit can then form a set of residual combined torque limits.

Furthermore, the residual combined torque limit of a set corresponding to an operating mode is compared with the input torque limits of the first set and the second set corresponding to this same operating mode.

In other words, the control method can simultaneously or sequentially implement several identifications of a critical torque limit for several operating modes.

In practice, before identifying a non-N2'-regulated engine, the non-N2'-regulated engine may initially be an N2'-regulated engine that is supplied with fuel with a regulated fuel flow rate supplied by the second fuel metering valve controlled as a function of a flow rate setpoint transmitted by a second regulation system.

In other words, the identification of a non-N2'-regulated engine may be carried out during flight following a command issued intentionally by the pilot, for example for pilot training purposes. The identification of a non-N2'-regulated engine may also be carried out during flight following a technical problem.

In practice, the identification of a non-N2'-regulated engine may be an identification of a fault in the second regulation system.

Such a fault may consist, for example, of a failure that has occurred in one of the electronic boards of the second regulation system and may be detected by identifying an inconsistency in the input data. As indicated above, this fault of the second regulation system may be identified when the fuel flow rate permitted by a fuel metering valve does not attempt to move towards the received flow rate setpoint.

According to another advantageous aspect, the control setpoint limit may be generated in order for a second current operating torque transmitted by the at least one first output shaft to said at least one first coupling of the transmission system to be kept equal to or less than the critical torque limit.

Furthermore, compliance with the control setpoint limit may be implemented by commanding a reduction in the control setpoint of one or more regulation systems or by commanding a reduction in a collective pitch of the blades of a lift rotor by means of a collective pitch lever. Indeed, such a reduction in the collective pitch of the blades makes it possible to reduce the power needed to rotate the rotor at a predetermined speed of rotation depending on the current operating mode.

Moreover, when the critical torque limit is one of said at least one first input torque limit and second input torque limit, said at least one first regulation system may regulate the fuel flow rate supplied by said at least one first fuel metering valve as a function of a first rotational speed setpoint Nrref1 of at least one lift rotor.

In practice, this first rotational speed setpoint Nrref1 may be equal to a reference value that is predetermined or calculated from a predetermined reference value and may, for example, be equal to 105% of a predetermined reference value. Such a first rotational speed setpoint may correspond to one or more first operating modes of the rotorcraft wherein one engine from among all of the engines is not able to transmit engine torque to the rotor.

Furthermore, the first rotational speed setpoint Nrref1 may be determined by ground tests, flight tests or simulations.

This first rotational speed setpoint Nrref1 may therefore be stored prior to a mission of the rotorcraft in at least one memory on board the rotorcraft.

However, when the critical torque limit is said at least one residual combined torque limit, said at least one first regulation system may regulate the fuel flow rate supplied by said at least one first fuel metering valve as a function of a second rotational speed setpoint Nrref2 of said at least one lift rotor, the second rotational speed setpoint Nrref2 being less than the first rotational speed setpoint Nrref1.

In this case, this second rotational speed setpoint Nrref2 may be equal to a reference value that is predetermined or calculated from a predetermined reference value and may, for example, be equal to 100% of a predetermined reference value. This second rotational speed setpoint may correspond to one or more second operating modes of the rotorcraft wherein all of the engines are able to transmit an engine torque to the lift rotor.

Furthermore, this second rotational speed setpoint Nrref2 may also be determined by ground tests, flight tests or simulations.

This second rotational speed setpoint Nrref2 may therefore be stored prior to a mission of the rotorcraft in at least one memory on board the rotorcraft.

Furthermore, the control method may comprise displaying information useful for piloting on a display arranged in the rotorcraft or outside the rotorcraft.

According to a first alternative, when the critical torque limit is one of said at least one first input torque limit and second input torque limit, the method may comprise the following steps:

generating information representative of a first operating mode; and
    displaying, on a display, at least one first limit indicator corresponding to the first operating mode.

Such an at least one first limit indicator may then comprise, for example, an index against a graduated scale. The index is then representative of a current value of engine torque transmitted by the engines. Such an index may therefore move in relation to the scale, for example as a function of the conditions of flight and maneuvers performed by the rotorcraft.

In practice, a value of the critical torque limit may be assigned to a first limit indicator from among said at least one first limit indicator.

Therefore, a mark on the graduated scale of the first OEI limit indicator may be representative of this current value of said at least one critical torque limit. Such a mark then constitutes a threshold value that must not be passed in order to comply with a predetermined load level for the engine or engines in operation for a maximum flight time.

Furthermore, several marks on the graduated scale may be displayed simultaneously and may represent different threshold values not to be passed in order to comply with different load levels according to this first operating mode. Each predetermined load level may then correspond to a predetermined maximum period of use of the corresponding limit.

According to a second alternative, when the critical torque limit is the residual combined torque limit, the method may comprise the following steps:

generating information representative of a second operating mode; and
    displaying, on a display, at least one second limit indicator corresponding to the second operating mode.

As previously in the first operating mode, such an at least one second limit indicator may then, for example, comprise an index and a graduated scale. The index is then representative of a current value of torque transmitted by the engines.

In practice, the value or values of said at least one critical torque limit are in this case not assigned to said at least one second limit indicator.

Advantageously, the method may comprise the following steps:

previously determining threshold values of said at least one first limit indicator and at least one second limit indicator;
    and storing the threshold values in at least one memory.

In other words, the threshold values of said at least one first limit indicator and at least one second limit indicator may be determined upstream of a mission of the rotorcraft, for example by bench tests, flight tests or simulation.

The control system then comprises a memory for storing the different threshold values of said at least one first limit indicator and at least one second limit indicator.

Such a memory is then advantageously on board the rotorcraft.

According to another advantageous embodiment, the rotorcraft comprising an automatic flight control system and at least one lift rotor provided with blades, the method may comprise calculating a collective pitch margin applicable to the blades and controlling a collective pitch of the blades in order to automatically control the rotorcraft while complying with said at least one critical torque limit.

In other words, the control system may be connected to an automatic flight control system of the rotorcraft that allows the rotorcraft to be controlled along four axes, such as a roll axis, a pitch axis, a yaw axis and a collective pitch axis. The controller of the control system may then generate and transmit to the automatic flight control system one or more power margins or indeed, directly, collective pitch margins applicable to the blades. The control system may also transmit, to the automatic flight control system, either information representative of the first operating mode of said at least two engines, or information representative of the second current operating mode of said at least two engines.

The object of the present disclosure is also a rotorcraft comprising at least two combustion engines, at least one regulation system and one transmission system, said at least two engines being mechanically connected to the transmission system respectively by at least two couplings.

Such a rotorcraft is remarkable in that it comprises a control system configured to implement the abovementioned control method.

Such a control system is integrated into the rotorcraft and constitutes equipment of the rotorcraft. The control system may then be connected to a flight management device of the rotorcraft and to an automatic flight control system.

Such a control system may in particular comprise a computer and a memory.

The object of the present disclosure is also a computer program comprising instructions that, when the program is run by the control system of the rotorcraft described above, cause the control method described above to be implemented.

The computer program is, for example, run by a computing device or a computer comprising at least one processor, at least one integrated circuit, at least one programmable system, at least one logic circuit, and a memory, these examples not limiting the scope given to the expression "computing device" or "computer".

The memory can be used to store the computer program and various information used by the computer program, i.e., the control setpoints to be transmitted to said actuators, the current value of a first current operating torque transmitted by the second output shaft to the second coupling of the transmission system, first and second permissible input torque limits for at least one first coupling and one second coupling of the transmission system, the permissible residual combined torque limit or limits for at least one member of a mixing unit of the transmission system and the critical torque limit.

Such a memory can also be used to store the information representative of the first operating mode or the information representative of the second operating mode.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

As already mentioned, the disclosure relates to a method for controlling a rotorcraft.

Figure 1:
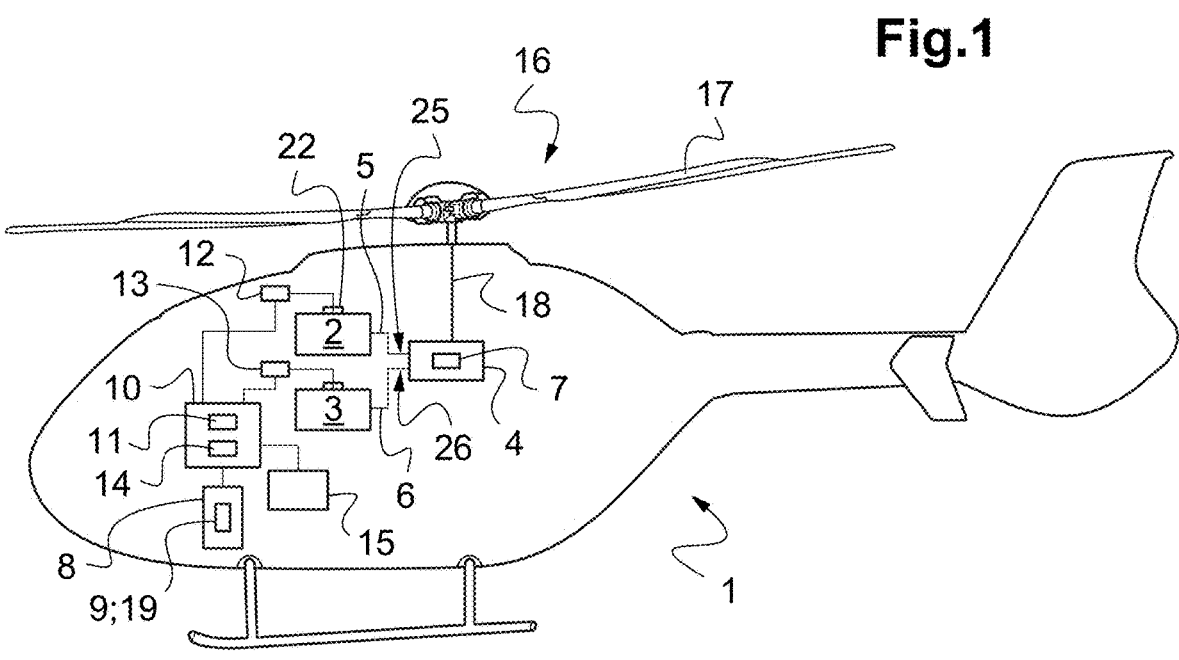
FIG. 1 is a side view diagram of a rotorcraft according to the disclosure.

As shown in FIG. 1, such a rotorcraft 1 comprises at least two combustion engines 2, 3, including a first engine 2 and a second engine 3. The engines 2, 3 are each able to transmit engine torque, via a transmission system 4, to at least one lift rotor 16 providing at least lift keeping the rotorcraft 1 in the air. The engines 2, 3 are thus connected to the transmission system 4, that is connected to at least one lift rotor 16 provided with blades 17.

The transmission system 4 comprises at least one first coupling 25 connected with at least one first output shaft 5 of the first engine 2 and a second coupling 26 connected with a second output shaft 6 of the second engine 3 and at least one output shaft 18 connected to the lift rotor 16.

The transmission system 4 comprises several internal members such as gears, speed-reduction stages and at least one mixing unit 7, for example.

Furthermore, such a rotorcraft 1 also comprises at least one first regulation system 12 for regulating the fuel intake of the first engine 2. The rotorcraft 1 may possibly comprise a second regulation system 13 for modifying the fuel intake of the second engine 3.

Moreover, the first engine 2 is supplied with fuel by a first fuel metering valve 22 controlled by the first regulation system 12. The first engine 2 is thus referred to hereinafter as being an N2-regulated engine, N2 corresponding to the speed of rotation N2 of the first output shaft 5. The first fuel metering valve 22 is able to modify a fuel flow rate transmitted to the N2-regulated engine 2 depending on a position or flow rate setpoint transmitted by the first regulation system 12.

Moreover, the second engine 3 may be supplied with fuel by a second fuel metering valve 23 that is controlled by a second regulation system 13 that is not regulated at N2', N2' corresponding to the speed of rotation N2' of the second output shaft 6, or is not controlled by the second regulation system 13 when it has failed or stops. Alternatively, the second engine 3 may not be regulated at N2'. The second engine 3 can therefore be referred to hereinafter as being a non-N2'-regulated engine in the context of the method of the disclosure.

The control method according to the disclosure is then implemented by a control system 10 connected via wired or wireless means at least to the first regulation system 12, and also to the second regulation system 13 when the latter is present. Such a control system 10 may comprise, for example, a controller 11 comprising one or more sensing devices, one or more computers and at least one memory 14, at least one integrated circuit, at least one programmable system, at least one logic circuit, these examples not limiting the scope to be given to the term "control system". The term "computer" may refer equally to a processor, a central processing unit or CPU, a graphics processing unit or GPU, a digital signal processor or DSP, a microcontroller, etc.

Furthermore, the memory 14 can be used to store a computer program implementing the control method according to the disclosure.

Moreover, the controller 11 of the control system 10 is configured to determine whether the engine is an N2-regulated engine or a non-N2'-regulated engine.

Figure 2:
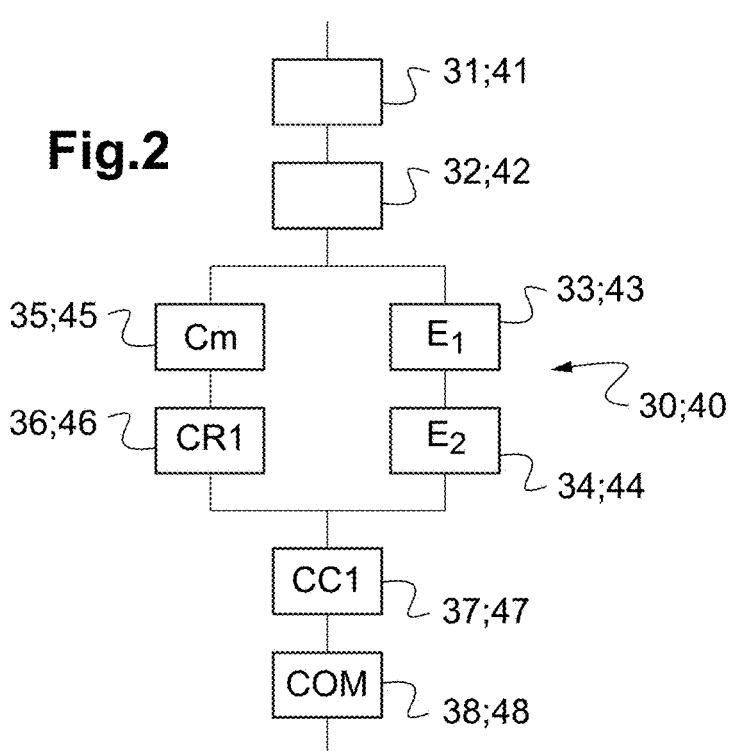
FIG. 2 is a logic diagram showing a control method according to the disclosure.
Figure 3:
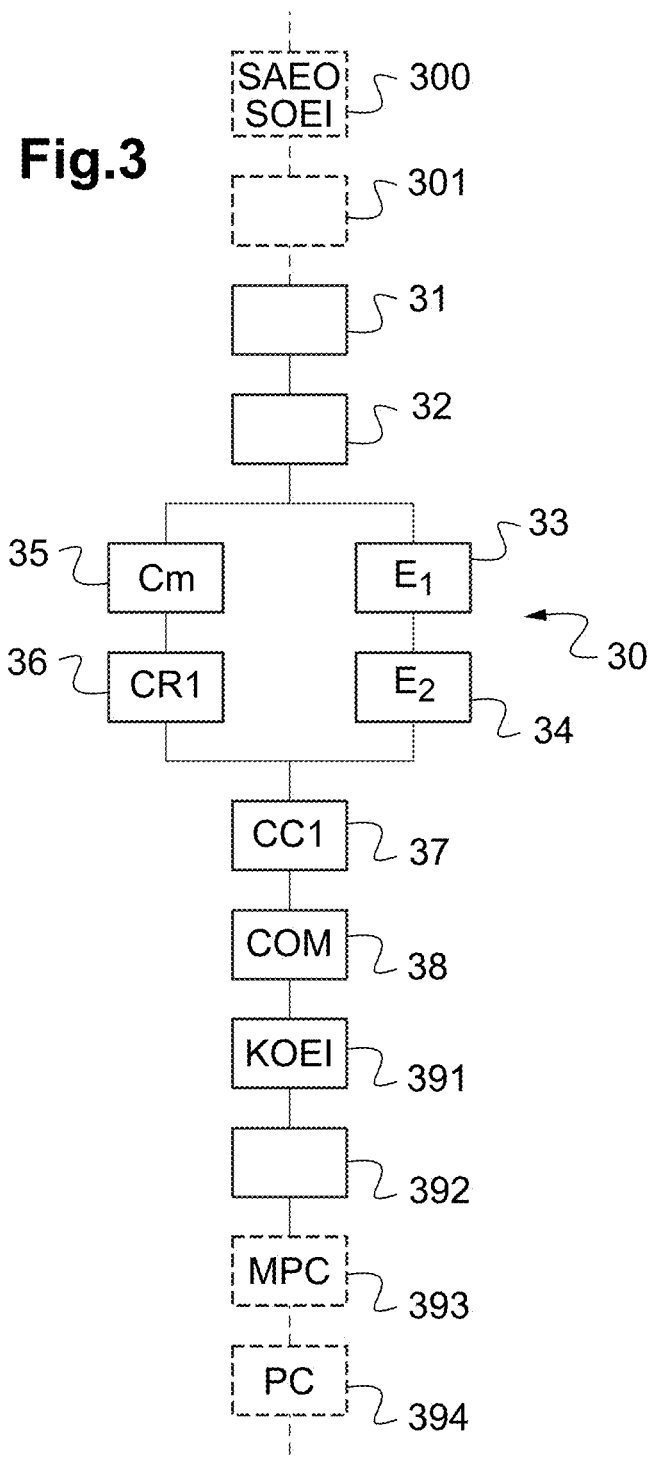
FIG. 3 is a logic diagram showing a first variant of the control method according to the disclosure.
Figure 4:
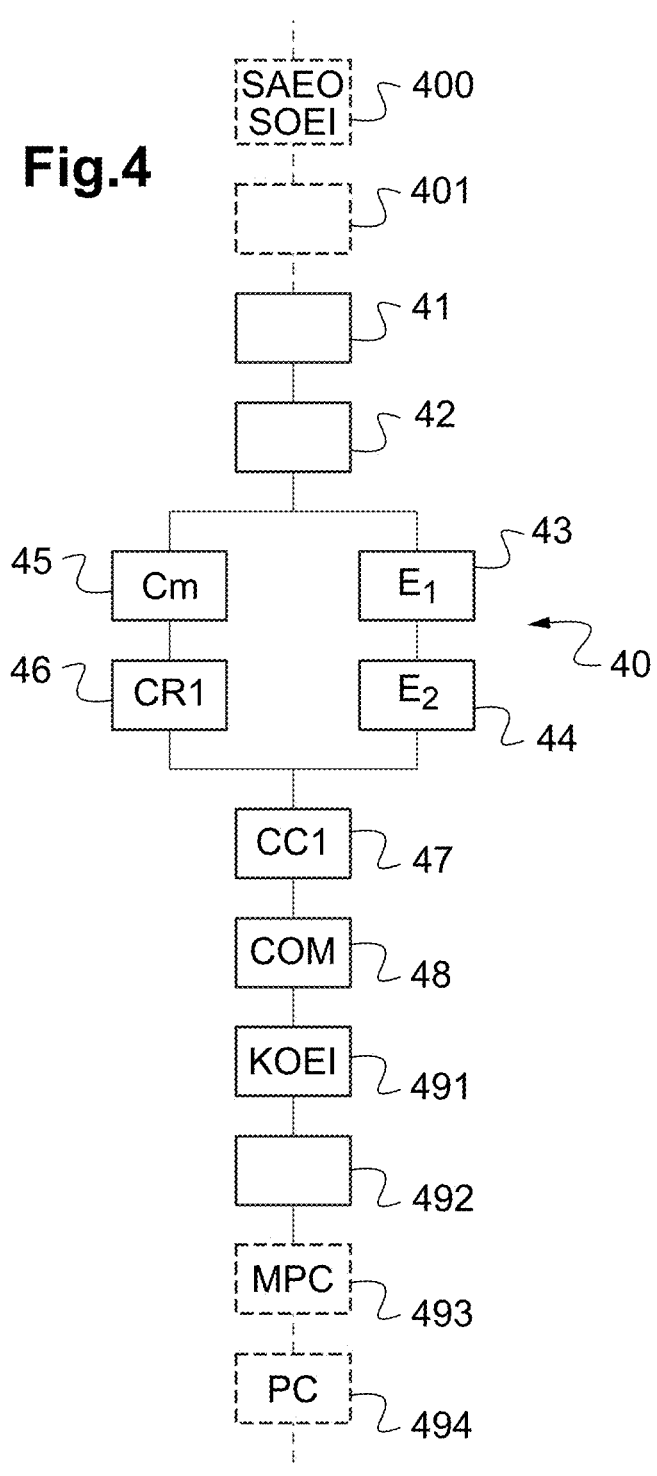
FIG. 4 is a logic diagram showing a second variant of the control method according to the disclosure.

As shown in FIGS. 2 to 4, the control method 30, 40 then comprises the identification 31, 41, by the controller 11, of an N2-regulated engine 2 from among the at least two engines 2, 3 and the identification 32, 42, by the controller 11, of a non-N2'-regulated engine 3 from among the at least two engines 2, 3.

Furthermore, as indicated above, the non-N2'-regulated engine may be an engine configured to not be regulated at N2' or an engine initially regulated at N2'. Except in the event of failure, this engine is therefore supplied with fuel with a fuel flow rate regulated at N2' supplied by the second fuel metering valve 23 controlled as a function of a flow rate setpoint transmitted by the second regulation system 13. The identification 32 of a non-N2'-regulated engine 3 may therefore be implemented by identifying a fault in the second regulation system 13.

Once the N2-regulated engine or engines 2 and the non-N2'-regulated engine 3 have been identified, the control method 30, 40 comprises determining 33, 43 at least one first permissible input torque limit E1 for the first coupling or couplings 25 of the transmission system 4 and determining 34, 44 a second permissible input torque limit E2 for the second coupling 26 of the transmission system 4.

The first permissible input torque limit or limits E1 and the second permissible input torque limit E2 may be determined prior to a current mission of the rotorcraft 1 by flight tests, bench tests or simulations. These first and second input torque limits E1, E2 may then be stored in the memory 14 of the control system 10.

Such a control method 30, 40 next comprises determining 35, 45 a first current operating torque C1 transmitted by the second output shaft 6 to the second coupling 26.

Such a first current operating torque C1 may in particular be determined by a calculation carried out by the controller 11 of the control system 10 based on a current power delivered by the non-N2'-regulated engine 3 and a speed of rotation of the second output shaft 6.

Such a first current operating torque C1 may also be measured by torque sensors. The term "sensor" should be understood to mean a physical sensor capable of directly measuring the parameter in question, in this instance the first current operating torque, but also a system that may comprise one or more physical sensors as well as means for processing the signal that make it possible to provide an estimation of the parameter in question based on the measurements provided by these physical sensors.

Moreover, the control method 30, 40 comprises determining 34, 44 at least one permissible residual combined torque limit CR1 for at least one member of the mixing unit 7 of the transmission system 4. Moreover, such an at least one residual combined torque limit CR1 is calculated by the controller 11 of the control system 10 as a function of the first current operating torque C1 transmitted by the second shaft 6 of the non-N2'-regulated engine 3.

A residual combined torque limit CR1 is therefore equal to the difference between a permissible combined torque limit Cadm for a member of the mixing unit 7 and the product of the first current operating torque C1 and a reduction coefficient Z between a speed of rotation of the second coupling 26 and a speed of rotation of the member of the mixing unit 7.

Furthermore, this permissible torque limit Cadm may be determined prior to a current mission of the rotorcraft 1 by flight tests, bench tests or simulations. This permissible torque limit Cadm may also be stored in the memory 14 of the control system 10.

The control method 30, 40 then comprises the identification 37, 47, by the controller 11 of the control system 10, of at least one critical torque limit CC1. Such a critical torque limit CC1 is identified as being the lowest of the values from among the first input torque limit or limits E1, the second input torque limit E2 and the residual combined torque limit or limits CR1.

The control method 30, 40 finally comprises generating 38, 48 a control setpoint limit COM of the first regulation system or systems 22 for the N2-regulated engine or engines 2. Such a control setpoint limit COM is generated by the controller 11 of the control system 10 as a function of said at least one critical torque limit CC1. This step of generating 38 the control setpoint limit COM of the first regulation system or systems 22 makes it possible to automatically limit the total power transmitted jointly by the engines 2 and 3 to the transmission system 4 in order to prevent a permissible input torque limit E1, E2 or a residual combined torque limit CR1 from being exceeded.

The control system 10 can thus limit the control setpoint COM in order to comply with this at least one critical torque limit CC1.

Furthermore, when the critical torque limit CC1 is one of said at least one first input torque limit E1 and second input torque limit E2, said at least one first regulation system 12 can regulate the fuel flow rate supplied by the associated first fuel metering valve 22 as a function of a first rotational speed setpoint Nrref1 of at least one lift rotor 16 of the rotorcraft 1. Such a first rotational speed setpoint Nrref1 may moreover correspond to a nominal speed of rotation of the lift rotor or rotors 16 or be calculated based on the nominal speed of rotation, for example being equal to 105% of the nominal speed of rotation. This first rotational speed setpoint Nrref1 is also used, for example, when one of the engines 2 or 3 does not transmit engine torque to the one of the first and second input shafts 5, 6.

However, when the critical torque limit CC1 is said at least one residual combined torque limit CR1, said at least one first regulation system 12 may regulate the fuel flow rate supplied by said at least one first fuel metering valve 22 as a function of a second rotational speed setpoint Nrref2 of the lift rotor or rotors 16, the second rotational speed setpoint Nrref2 being less than the first rotational speed setpoint Nrref1.

Such a second rotational speed setpoint Nrref2 may correspond to a speed of rotation equal to 100% of the nominal speed of rotation of the lift rotor or rotors 16. This second rotational speed setpoint Nrref2 may be used when each of the engines 2 and 3 transmits engine torque to the first and second input shafts 5, 6 respectively.

The control system 10 may then limit the power delivered by the N2-regulated engine or engines 2 according to the critical torque limit CC1.

As shown in FIG. 3, when said at least one critical torque limit CC1 is one of said at least one first or second input torque limits E1, E2, the method 30 may comprise generating 391 information KOEI representative of asymmetrical or OEI operation of said at least two engines 2, 3.

In this case, the method 30 then comprises displaying 392, on a display 8, at least one OEI limit indicator 9 corresponding to asymmetrical OEI operation.

Such a display 8 is, for example, formed by a screen equipping an instrument panel of a cockpit of the rotorcraft 1 or indeed by a head-up display system worn by a pilot and arranged, for example, on a helmet, or goggles.

In this case, the display 8 is connected via wired or wireless means to the control system 10 and can display a value of the critical torque limit CC1 on the OEI limit indicator 9 corresponding to the asymmetrical OEI operation of the engines 2, 3.

According to another embodiment, such a display 8 may also be located outside the rotorcraft 1, for example when the latter is piloted remotely.

As shown in FIG. 4, when said at least one critical torque limit CC1 is said at least one residual combined torque limit CR1, such a method 40 may comprise generating 491 information KAEO representative of symmetrical or AEO operation of said at least two engines 2, 3, and displaying 48, on the display 8, at least one AEO limit indicator 19 corresponding to the symmetrical AEO operation.

Furthermore, as shown in FIGS. 3 and 4, the control method 30, 40 may comprise previously determining 300, 400 threshold values SAEO, SOEI of said at least one AEO limit indicator 19 and at least one OEI limit indicator 9.

Moreover, the control method 30, 40 may comprise storing 301, 401 the threshold values SAEO, SOEI of said at least one AEO limit indicator 19 and at least one OEI limit indicator 9.

Furthermore, the rotorcraft 1 may also comprise an automatic flight control system 15 that is able to act on the collective pitch of the blades of the lift rotor or rotors 16. Such an automatic flight control system 15 is connected via wired or wireless means to the control system 10.

The method 30, 40 may then comprise calculating 393, 493 collective pitch margins MPC applicable to said blades 17. The calculation 393, 493 may be implemented by the control system 10 that transmits it to the automatic flight control system 15.

The method 30, 40 may then comprise controlling 394, 494 a collective pitch PC of the blades 17 in order to automatically pilot the rotorcraft 1 while complying with said at least one critical torque limit CC1.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. A method for controlling a rotorcraft, the rotorcraft comprising at least two combustion engines, at least one regulation system and one transmission system, the at least two engines being mechanically connected to the transmission system respectively by at least two couplings, wherein the control method comprises at least the following steps:

identifying at least one engine referred to as an N2-regulated engine from among the at least two engines, the at least one N2-regulated engine being identified as an engine supplied with fuel with a fuel flow rate regulated as a function of the speed of rotation N2 of at least one first output shaft of the at least one N2-regulated engine and supplied by at least one first fuel metering valve controlled as a function of a flow rate setpoint transmitted by at least one first regulation system depending on the speed of rotation N2 of the at least one first output shaft;

identifying an engine referred to as a non-N2'-regulated engine from among the at least two engines, the non-N2'-regulated engine being identified as an engine supplied with fuel with a fuel flow rate that is not regulated as a function of the speed of rotation N2' of a second output shaft and supplied by a second fuel metering valve being that is either not regulated, or is controlled as a function of a flow rate setpoint transmitted by at least one second regulation system irrespective of the speed of rotation N2' of the second output shaft;

determining at least one first permissible input torque limit for at least one first coupling of the transmission system connected to the at least one first output shaft;

determining a second permissible input torque limit for a second coupling of the transmission system connected to the second output shaft;

determining a first current operating torque transmitted by the second output shaft to the second coupling of the transmission system;

determining at least one permissible residual combined torque limit for at least one member of a mixing unit of the transmission system, the at least one residual combined torque limit being calculated according to the following formula:

$$CR1 = Cadm - (C1*Z)$$

where Cadm is a permissible combined torque limit for the at least one member of the mixing unit;

C1 is the first current operating torque transmitted by the second output shaft to the second coupling of the transmission system; and Z is a reduction coefficient between a speed of rotation of the second coupling and a speed of rotation of the at least one member of the mixing unit;

identifying a critical torque limit as being the lowest of the values from among the at least one first input torque limit, second input torque limit and at least one residual combined torque limit; and generation of a control setpoint limit of the at least one first regulation system, the control setpoint limit being generated as a function of the critical torque limit.

2. The control method according to claim 1, wherein, before the identification of a non-N2'-regulated engine, the non-N2'-regulated engine is initially an N2'-regulated engine that is supplied with fuel with a fuel flow rate regulated at N2' supplied by the second fuel metering valve controlled as a function of a flow rate setpoint transmitted by a second regulation system.

3. The control method according to claim 2, wherein the identification of a non-N2'-regulated engine is an identification of a fault of the second regulation system.

4. The control method according to claim 1, wherein the control setpoint limit is generated in order for a second current operating torque transmitted by the at least one first output shaft to the at least one first coupling of the transmission system to be kept equal to or less than the critical torque limit.

5. The control method according to claim 1, wherein, when the critical torque limit is one of the at least one first input torque limit and second input torque limit, the at least one first regulation system regulates the fuel flow rate supplied by the at least one first fuel metering valve as a function of a first rotational speed setpoint of at least one lift rotor of the rotorcraft.

6. The control method according to claim 5, wherein, when the critical torque limit is the at least one residual combined torque limit, the at least one first regulation system regulates the fuel flow rate supplied by the at least one first fuel metering valve as a function of a second rotational speed setpoint of the at least one lift rotor of the rotorcraft, the second rotational speed setpoint being less than the first rotational speed setpoint.

7. The control method according to claim 1, wherein, when the critical torque limit is one of the at least one first input torque limit and second input torque limit, the method comprises the following steps:

generating information representative of a first operating mode; and displaying, on a display, at least one first limit indicator corresponding to the first operating mode.

8. The control method according to claim 7, wherein a value of the critical torque limit is assigned to a first limit indicator from among the at least one first limit indicator.

9. The control method according to claim 1, wherein, when the critical torque limit is the residual combined torque limit, the method may comprise the following steps:

generating information representative of a second operating mode; and displaying, on a display, at least one second limit indicator corresponding to the second operating mode.

10. The control method according to claim 7, wherein, when the critical torque limit is the residual combined torque limit, the method comprising the following steps:

generating information representative of a second operating mode;

displaying, on a display, at least one second limit indicator corresponding to the second operating mode, and wherein the method comprises the following steps;

previously determining threshold values of the at least one first limit indicator and at least one second limit indicator; and storing the threshold values in at least one memory.

11. The control method according to claim 1, wherein, the rotorcraft comprising an automatic flight control system and at least one lift rotor provided with blades, the method comprises calculating a collective pitch margin applicable to the blades and controlling a collective pitch of the blades in order to automatically pilot the rotorcraft while complying with the at least one critical torque limit.

12. The control method of claim 1, wherein identifying the non-N2'-regulated engine comprises detecting a fault of the second regulation system and, in response to the detected fault, determining the residual combined torque limit and generating the control setpoint limit based on the critical torque limit.

13. The control method of claim 1, wherein identifying the non-N2'-regulated engine comprises detecting that a position or fuel flow permitted by the second fuel metering valve does not correspond to a flow-rate setpoint received from the second regulation system.

14. An aircraft comprising at least two combustion engines, at least one regulation system and one transmission system, the at least two engines being mechanically connected to the transmission system respectively by at least two couplings, wherein the rotorcraft comprises a control system configured to implement the control method according to claim 1.

15. A non-transitory computer-readable medium storing a computer program comprising instructions that, when the program is run by the control system of the rotorcraft according to claim 14, cause the control method to be implemented.

16. A method for controlling a rotorcraft, the rotorcraft comprising two combustion engines, a regulation system and a transmission system, the two engines mechanically connected to the transmission system respectively by couplings, wherein the control method comprises the following steps:

identifying one engine referred to as an N2-regulated engine from among the two engines, the one N2-regulated engine identified as an engine supplied with fuel with a fuel flow rate regulated as a function of the speed of rotation N2 of one first output shaft of the one N2-regulated engine and supplied by one first fuel metering valve controlled as a function of a flow rate setpoint transmitted by one first regulation system depending on the speed of rotation N2 of the one first output shaft;

identifying an engine referred to as a non-N2'-regulated engine from among the two engines, the non-N2'-regulated engine being identified as an engine supplied with fuel with a fuel flow rate that is not regulated as a function of the speed of rotation N2' of a second output shaft and supplied by a second fuel metering valve being that is either not regulated, or is controlled as a function of a flow rate setpoint transmitted by one second regulation system irrespective of the speed of rotation N2' of the second output shaft;

determining one first permissible input torque limit for one first coupling of the transmission system connected to the one first output shaft;

determining a second permissible input torque limit for a second coupling of the transmission system connected to the second output shaft;

determining a first current operating torque transmitted by the second output shaft to the second coupling of the transmission system;

determining one permissible residual combined torque limit for one member of a mixing unit of the transmission system, the one residual combined torque limit being calculated according to the following formula:

$$CR1 = Cadm - (C1 * Z)$$

where Cadm is a permissible combined torque limit for the one member of the mixing unit;

C1 is the first current operating torque transmitted by the second output shaft to the second coupling of the transmission system; and Z is a reduction coefficient between a speed of rotation of the second coupling and a speed of rotation of the one member of the mixing unit;

identifying a critical torque limit as being the lowest of the values from among the one first input torque limit, second input torque limit and one residual combined torque limit; and generating a control setpoint limit of the one first regulation system, the control setpoint limit being generated as a function of the critical torque limit.

17. The control method according to claim 16, wherein, before the identification of a non-N2'-regulated engine, the non-N2'-regulated engine is initially an N2'-regulated engine that is supplied with fuel with a fuel flow rate regulated at N2' supplied by the second fuel metering valve controlled as a function of a flow rate setpoint transmitted by a second regulation system.

18. The control method of claim 16, wherein identifying the non-N2'-regulated engine comprises detecting that a position or fuel flow permitted by the second fuel metering valve does not correspond to a flow-rate setpoint received from the second regulation system.

19. The control method according to claim 16, wherein the control setpoint limit is generated in order for a second current operating torque transmitted by the one first output shaft to the one first coupling of the transmission system to be kept equal to or less than the critical torque limit.

20. The control method of claim 16, wherein identifying the non-N2'-regulated engine comprises detecting a fault of the second regulation system and, in response to the detected fault, determining the residual combined torque limit and generating the control setpoint limit based on the critical torque limit.

\* \* \* \* \*